United States Patent [19]

Katsumata

[11] Patent Number: 5,086,095

[45] Date of Patent: Feb. 4, 1992

[54] WEATHER-RESISTANT POLYACETAL RESIN COMPOSITIONS AND MOLDED ARTICLES THEREOF

[75] Inventor: Toru Katsumata, Shizuoka, Japan

[73] Assignee: Polyplastics Co., Ltd., Osaka, Japan

[21] Appl. No.: 597,169

[22] Filed: Oct. 15, 1990

[30] Foreign Application Priority Data

Oct. 2, 1989 [JP] Japan ................................. 1-257240

[51] Int. Cl.$^5$ .............................................. C08K 5/34
[52] U.S. Cl. ........................................ 524/91; 524/99;
524/100; 524/102; 524/291; 524/310; 524/312;
524/313; 524/317; 524/338; 524/359; 524/495;
524/519; 524/520; 524/560; 525/155
[58] Field of Search .................. 524/91, 99, 100, 102,
524/291, 310, 312, 313, 317, 338, 495, 359, 560,
520, 519; 525/155

[56] References Cited

U.S. PATENT DOCUMENTS

| | | | |
|---|---|---|---|
| 4,649,172 | 3/1987 | Yanase et al. | 524/413 |
| 4,737,539 | 4/1988 | Jinno et al. | 525/155 |
| 4,975,478 | 12/1990 | Okuda | 524/560 |

FOREIGN PATENT DOCUMENTS

| | | |
|---|---|---|
| 0159904 | 10/1985 | European Pat. Off. . |
| 0172691 | 2/1986 | European Pat. Off. . |
| 0300573 | 1/1989 | European Pat. Off. . |
| 0356167 | 2/1990 | European Pat. Off. . |

OTHER PUBLICATIONS

Patent Abstracts of Japan, vol. 012, No. 501 (C-556), Dec. 27, 1988.

*Primary Examiner*—Kriellion S. Morgan
*Assistant Examiner*—Tae H. Yoon
*Attorney, Agent, or Firm*—Nixon & Vanderhye

[57] ABSTRACT

Weather-resistant polyacetal resin compositions and molded articles formed of the same include a polyacetal base resin, and a weather-resistant effective amount of a weather stabilizing package comprised of (i) a weather stabilizer that is at least one selected from the group consisting of benzotriazoles, benzophenones, aromatic benzoates, cyanoacrylates, oxalanilides and hindered amines (ii) a homopolymer or copolymer of acrylic or methacrylic acid, or ester derivatives thereof, and (iii) a fluororesin.

9 Claims, No Drawings

WEATHER-RESISTANT POLYACETAL RESIN COMPOSITIONS AND MOLDED ARTICLES THEREOF

FIELD OF INVENTION

The present invention relates to polyacetal resin compositions having excellent weather resistance properties. More specifically, the present invention relates to weather-resistant polyacetal resin compositions which, in preferred embodiments, include a polyacetal base resin, a weather stabilizer, an acrylic resin and a fluororesin.

BACKGROUND AND SUMMARY OF THE INVENTION

As is well known, polyacetal resins have been used in various fields as an engineering plastic due to the excellent physical properties (such as mechanical and electric properties) and chemical properties (such as chemical resistance and heat resistance properties) that such resins possess. However, additional (and more specialized) properties are required of polyacetal resins as new end-use applications are identified. One property of polyacetal resins that is in continual need for improvement is its weather resistance property.

In this regard, polyacetal resins have recently been used to form molded parts for automobile components as well as components for electrical appliances. As can be appreciated, these components are typically exposed to conditions that may disadvantageously affect component properties and/or appearance. For example, automotive components are usually subjected to sunlight, rain and/or outer atmosphere conditions for prolonged time periods. As a result, components used in such end-use environments become discolored and/or lose their surface smoothness or gloss. In addition, cracks may form on the component surfaces thereby disadvantageously affecting the quality of the component. To overcome these problems, weather stabilizers have typically been blended with resins so as to improve the resins' weather resistance properties. However, simply incorporating a weather stabilizer in a polyacetal base resin does not necessarily achieve satisfactory results. Thus, further improvements in the weather resistance properties of polyacetal resins has been needed.

In this connection, a considerable effect can be obtained by incorporating a weather stabilizer and an acrylic resin into a polyacetal base resin. However, the resulting surface conditions (such as crack formation and gloss) and mechanical properties of molded articles formed of such a modified polyacetal resin are not always satisfactory when the articles are exposed to sunlight (ultraviolet rays), rain, and like weather conditions for prolonged time periods. Thus, polyacetal resins having durable weather resistance properties are often required.

Increasing the amounts of the weather stabilizer and the acrylic resin in the overall polyacetal resin compositions results in only limited improvements in the weather resistance properties. Furthermore, an increase in the amount of these additives usually deteriorates the mechanical and physical properties of the resin. In addition, excess weather stabilizer and acrylic resin can cause poor mold release, adhesion to the mold, and mold deposits during molding which can reduce the dimensional accuracy and/or impair the appearance of the molded article, as well as increasing the cleaning frequency of the mold. As a result, the efficiency of the molding operation is reduced.

The present invention broadly relates to polyacetal resin compositions and molded articles formed of the same which retain their "as produced" surface state by inhibiting crack formation when the articles are used outdoors without sacrificing the desirable property characteristics inherent in polyacetal resins generally.

More particularly, the present invention provides a weather-resistant polyacetal resin composition comprising (in weight percentages based on the total weight of the composition):

(A) a polyacetal base resin;
(B) between 0.01 to 5% by weight of a weather stabilizer;
(C) between 1 to 40% by weight of an acrylic resin; and
(D) between 1 to 20% by weight of a fluororesin.

Further aspects and advantages of the present invention will become more apparent after careful consideration is given to the detailed description of the preferred exemplary embodiment which follows.

DETAILED DESCRIPTION OF THE PREFERRED EXEMPLARY EMBODIMENTS

The polyacetal base resin (A) used in the compositions of the present invention is a polymeric compound predominantly comprising repeating oxymethylene groups ($-CH_2O-$) as the main constitutive units in the polymeric chain. The polyacetal base resin may thus be a polyoxymethylene homopolymer or a copolymer, terpolymer or block copolymer comprised mainly of oxymethylene groups with a minor amount of other constitutive units. The polyacetal resin is most preferably a linear chain structure, but branched or cross-linked structures may also be employed. The degree of polymerization of the polyacetal base resin is similarly not particularly limited, although the polyacetal base resin will have a sufficiently high degree of polymerization so as to be classified as an "engineering resin", and/or will be normally solid at the ambient temperatures of its use.

The polyacetal base resin will be present in the compositions of the present invention in an amount between about 35 to about 97.99 wt. %, based on the total composition weight.

The preferred weather stabilizers (B) used in the present invention include one or more stabilizing agents selected from the group consisting of (1) benzotriazoles, (2) benzophenones, (3) aromatic benzoates, (4) cyanoacrylates, (5) oxalanilides and (6) hindered amines.

Specific examples include:
(1) benzotriazoles:
 2-(2'-hydroxy-5'-methylphenyl)benzotriazole,
 2-(2'-hydroxy-3',5'-di-t-butylphenyl)benzotriazole,
 2-(3,5-di-t-amyl-2-hydroxyphenyl)benzotriazole,
 2-(2'-hydroxy-3'-5'-diisoamylphenyl)benzotriazole,
 2-[hydroxy-3,5-bis(α,α-dimethylbenzyl)phenyl] benzotriazole and
 2-(2'-hydroxy-4'-octoxyphenyl)benzotriazole.
(2) benzophenones:
 2,4-dihydroxybenzophenone,
 2-hydroxy-4-methoxybenzophenone,
 2-hydroxy-4-octoxybenzophenone,
 2-hydroxy-4-dodecyloxybenzophenone,
 2,2'-dihydroxy-4-methoxybenzophenone,
 2,2'-dihydroxy-4,4'-dimethoxybenzophenone,
 2-hydroxy-4-methoxy-5-sulfobenzophenone and 2-hydroxy-4-oxybenzylbenzophenone.

(3) aromatic benzoates: p-t-butylphenyl salicylate and p-octylphenyl salicylate.

(4) cyanoacrylates: 2-ethylhexyl 2-cyano-3,3'-diphenylacrylate and ethyl 2-cyano-3,3'-diphenylacrylate.

(5) oxalanilides:
N-(2-ethylphenyl)-N'-(2-ethoxy-5-t-butylphenyl) oxamide and
N-(2-ethyle-phenyl)-N'-(2-ethoxyphenyl)oxamide.

(6) hindered amines: piperidine derivatives each having a sterically hindered group, such as 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methocy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine,
bis(2,2,6,6-tetramethyl-4-peperidyl) oxalate,
bis(2,2,6,6-tetramethyl-4-piperidyl) oxalate,
bis(2,2,6,6-tetramethyl-4-piperidyl) malonate,
bis(2,2,6,6-tetramethyl-4-piperidyl) adipate,
bis(2,2,6,6-tetramethyl-4-piperidyl) sebacate,
bis(1,2,2,6,6-pentamethylpiperidyl) sebacate,
bis(2,2,6,6-tetramethyl-4-piperidyl) terephthalate,
1,2-bis(2,2,6,6-tetramethyl-4-piperidyloxy)ethane,
bis(2,2,6,6-tetramethyl-4-piperidyl) hexamehtylene-1,6-dicarbamate, bis(1-methyle-2,2,2,6,6-tetramethyl-4-piperidyl) adipate and tris(2,2,6,6-tetramethyl-4-piperidyl) benzene-1,3,5-tricarboxylate. Furthermore high-molecular piperidine derivative polycondensates such as dimethyl succinate/1-(2-hydroxyethyl)-4-hydroxy-2,2,6,6-tetramethylpiperidine polycondensate are also effective.

The above-noted weather stabilizers may be used alone, or preferably as a mixture of two or more of the same. A combination of weather stabilizers that includes at least one hindered amine is particularly preferred.

A suitable amount of the weather stabilizer used herein is between 0.01 to 5% by weight (based on the entire composition weight), particularly preferably between 0.02 to 3% by weight. When the amount of the weather stabilizer is insufficient, the intended weather-stabilizing effect cannot be attained. On the other hand, an excessive amount of weather-stabilizer is not only economically disadvantageous, but also poses problems such as deterioration of mechanical properties and mold contamination.

The acrylic resin (C) used in the present invention is preferably selected from homopolymers or copolymers of acrylic acid and its esters (such as methyl acrylate, ethyl acrylate, n-propyl acrylate, isopropyl acrylate, n-butyl acrylate, n-hexyl acrylate and n-octyl acrylate), or those of methacrylic acid and its esters (such as methyl methacrylate, ethyl methacrylate, n-propyl methacrylate, isopropyl methacrylate, n-butyl methacrylate, n-amyl methacrylate and n-octyl methacrylate), or copolymers of such polymers with styrene, acrylonitrile butadiene and isoprene. Preferred are homopolymers of methyl methacrylate or copolymers of methyl methacrylate as the main constituent, and a methacrylate other than methyl methacrylate, styrene or acrylonitrile.

The amount of the acrylic resin used herein is suitably between 1 to 40% by weight (based on the entire composition weight), particularly preferably between 5 to 30% by weight. When the amount of the acrylic resin is insufficient, the resulting resin composition does not exhibit sufficient weather resistance properties, especially prevention of crack formation on the surface of the molded article. Excessive amount of acrylic resin produces an unfavorable effect on the mechanical properties and thermal stability of the molded articles.

Although the weather resistance is improved somewhat by incorporating an acrylic resin in combination with a weather stabilizer, the effect is still insufficient for many end-use applications. In addition, the above-described problems, such as deterioration of the mechanical and physical properties and disturbance of the molding operation are typically still present.

Under these circumstances, the present invention is especially characterized in that the above-described polyacetal base resin, weather stabilizer, and acrylic resin components are used in combination with a fluororesin (D). Such a combination of components has been discovered to be quite effective in improving the weather resistance as evidenced by the surface gloss retention and crack formation inhibition without impairing the other well-balanced physical characteristics inherent in polyacetal resins generally.

Examples of fluororesins usable in the compositions of the present invention include polytetrafluoroethylene, polytrifluoroethylene, polyhexafluoropropylene, polychlorotrifluoroethylene, polyvinyl fluoride, polyvinylidene fluoride, and tetrafluoroethylene/hexafluoropropylene copolymer, tetrafluoroethylen/perfluoroalky vinyl ether copolymers, tetrafluoroethylene/perfluorosulfonyl fluoride vinyl ether copolymer, tetrafluoroethylene/ethylene copolymer, chlorotrifluoroethylene/ethylene copolymer and tetrafluoroethylene/propylene copolymer.

The term "copolymer" as used herein represents random copolymers, alternating copolymers, block copolymers, graft copolymers and mixtures of them. Among them, preferred are polytetrafluoroethylene, polyvinyl fluoride, polyvinylidene fluoride, terafluoroethylene/hexafluoropropylene copolymer, tetrafluoroethylene/ethylene copolymer and mixtures of them. Still preferred are polytetrafluoroethylene, polyvinylidene fluoride and tetrafluoroethylene/ethylene copolymer.

The amount of the fluororesin used herein is suitably between 1 to 20% by weight (based on the entire composition weight), particularly preferably between 2 to 10% by weight. When the fluororesin component is used in amounts of less than 1% by weight, inadequate effects in terms of improving the weather resistance properties are obtained. On the other hand, when the fluororesin content exceeds 20% by weight, unfavorable effects upon the normal desirable characteristics inherent in polyacetal resins are usually observed.

Although the weather resistance properties of polyacetal resin are not significantly improved when the fluororesin component is added to the polyacetal resin alone, or together with either the weather stabilizer, or the acrylic resin, significant synergistic effects are obtained in terms of inhibiting crack formation on the surface of molded articles and/or reducing discoloration when a combination of components including a weather stabilizer, an acrylic resin and a fluororesin is employed.

Although the reasons why the beneficial effects obtained by the present invention are not fully understood at this time, fluororesins are extremely compatible with acrylic resins. In this regard, the fluidity of the acrylic resin is improved causing it to congregate locally at or near the surface of a molded article formed of the composition of this invention. Thus, the amount of fluororesin that may be added in combination with an acrylic resin can be greater than that which can be added to the polyacetal base resin in the absence of an acrylic resin. As a result, the weather resistance is significantly improved with only a small amount of acrylic resin. Other effects that are obtained are that flawed molding surfaces are prevented and mold-release properties are improved—effects that cannot be obtained when the acrylic resin is used alone.

It is sometimes desirable to add various known additives to the compositions of the present invention to further improve these thermal stability properties. In this regard, antioxidants, nitrogen compounds, alkali metal compounds and alkaline earth metal compounds may be preferably used, either alone or as a combination of two or more of the same.

The compositions of the present invention can be colored in any desired manner by suitably adding a dye or a pigment, such as carbon black, thereto. Particularly, the use of carbon black is effective as a means to further improve the weather resistance property of the polyacetal compositions in addition to imparting color characteristics thereto.

To impart desired properties to the composition of the present invention according to the use thereof, one or more of known additives can be incorporated thereinto. Other additives conventionally employed in thermoplastic resin compositions may be incorporated into the polyacetal compositions of the present invention to further improve the physical and/or chemical properties depending upon the intended end use. These conventional additives include lubricants, nucleating agents, release agents, antistatic agents, surfactants, organic polymeric materials, and inorganic or organic, fibrous, powdery or platy fillers.

The compositions of the present invention can be produced with known apparatus using known processing techniques for producing synthetic resin compositions. More specifically, the necessary components may be mixed together, kneaded and extruded using a single-screw or twin-screw extruder to form molding pellets, from which molded articles may be formed. Alternatively, the simultaneous preparation of the composition and molding of the final article may be practiced. In another process, a part or the entirety of the resin components are pulverized in order to facilitate dispersion. The components are then mixed and melt extruded to form pellets to be shaped into a molding.

The stabilizers and additives may be incorporated into the composition at any stage in the process. For example, they can be added, to the composition and mixed immediately before the formation of the final molding. The resin compositions of the present invention can be produced by any expedient plastics fabrication technique, such as extrusion molding, injection molding, compression molding, vacuum molding, blow molding and foam molding processes.

The compositions of the present invention exhibit superior surface conditions after exposure to ultraviolet rays or water for prolonged time periods. Specifically, crack formation time is far longer, the gloss-maintenance rate is higher and the extent of discoloration is lower for the compositions of this invention as compared to conventionally polyacetal resin compositions.

Furthermore, according to the present invention, the problems that are encountered when acrylic resins are used alone, such as poor moldability (releasability) and surface flawing can be overcome.

The weather-resistant polyacetal resin compositions of the present invention are suitable for use as a material for moldings in a number of end use applications in which weather resistance is required. Moldings formed of the compositions of this invention may be exposed to solar rays and rain for prolonged time periods and therefore may be used as exterior automotive parts (e.g. outer door handles, fuel lids, wheel covers, front fenders, and spoilers), interior automotive parts (e.g. inner door handles, and regulator handles), electric appliances, cameras, parts for other industrial products, construction materials and pipes, and other household articles.

EXAMPLES

The following nonlimiting Examples will further illustrate the present invention. In the following Examples, the composition properties such as weather resistance, were determined using the following methods:

(1) Weather resistance test (A and B)

The crack formation time and changes in surface conditions were determined with the following two types of weather resistance testers:

test method A: the samples were irradiated with ultraviolet rays with an ultraaccelerating weather resistance tester (SUV-W-11 of Iwasaki Electric Co., Ltd.) in an atmosphere of 83° C.

test method B: the samples were irradiated with ultraviolet rays under weathering conditions (including rain spray) at 63° C. with a weatherometer (WBL-SUN-HCH of Suga Test Instruments Co., Ltd.).

(2) Crack formation time

Test pieces were irradiated with ultraviolet rays using the above-described weather resistance testers under predetermined conditions for a given period of time. Crack formation on the surfaces of the test pieces were then visibly evaluated with a magnifying lens at 10× magnification. The "crack formation time" was the time at which the cracks were first observed with higher values being indicative of better weather resistance properties.

(3) Change in gloss

Test pieces were irradiated with ultraviolet rays with the above-described weather resistance testers under predetermined conditions for a given time to observe the gloss of the test pieces before and after the irradiation. The change in the gloss was classified in five numerical ranks. The lower the numerical rank the less change, or the less reduction of gloss was present.

Gloss was determined with a digital variable-angle gloss meter (UGV-4D mfd. by Suga Test Instruments Co., Ltd.) and the extent of gloss reduction was based upon the percentage of the initial gloss that was retained.

| extent of change | % gloss retention |
| --- | --- |
| 1 | >85 |
| 2 | 85-70 |
| 3 | 70-50 |
| 4 | 50-20 |

-continued

| extent of change | % gloss retention |
|---|---|
| 5 | <20 |

(4) Moldability (releasability)

Fifty plate-type moldings (70 mm×50 mm×3 mm) were continuously produced under molding conditions whereby the cylinder temperature was 190° C. and the mold temperature was 80° C. The molding states were classified into the following five qualitative ranks:

⊙: quite excellent (no problem),
○: good (1 to 4 plates remaining in the mold),
Δ: comparatively poor (5 to 10 plates remaining in the mold),
Δx: poor (11 to 25 plates remaining in the mold), and
x: considerably poor (26 or more plates remaining in the mold).

EXAMPLES 1 to 15 and COMPARATIVE EXAMPLES 1 to 12

A weather stabilizer (B), acrylic resin (c), fluororesin (D) and, if necessary, carbon black were added to polyacetal resin (A) (DURACON (M 90); trade name of Polyplastics Co., Ltd.) as shown in Table 1. The components were mixed together and melt-kneaded using a 30-mm twin-screw extruder to pelletize the composition. Then the pellets were shaped into test pieces with an injection molding machine to evaluate the weather resistance and other properties of them. For comparison, the same procedure as that described above was repeated except that the weather stabilizer (B) was added singly or in combination with acrylic resin (C) or fluororesin (D) (if necessary, carbon black).

TABLE 1

| | Example No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| (A) Polyacetal resin (wt. %) | 84.4 | 84.4 | 84.4 | 74.4 | 77.4 | 69.4 | 64.4 | 84.4 | 74.4 | 74.4 | 84.4 | 84.4 | 83.9 | 73.9 | 83.9 |
| (B) Weather (light) stabilizer | | | | | | | | | | | | | | | |
| Note 1 (wt. %) | B-1 (0.6) | — | B-1 (0.3) | B-1 (0.3) | B-1 (0.3) | B-1 (0.3) | B-1 (0.3) | B-1 (0.3) | B-1 (0.3) | B-1 (0.3) | B-2 (0.3) | B-1 (0.3) | B-1 (0.3) | B-1 (0.3) | B-1 (0.3) |
| Note 2 (wt. %) | — | B-3 (0.6) | B-3 (0.3) | B-3 (0.3) | B-3 (0.3) | B-3 (0.3) | B-3 (0.3) | B-3 (0.3) | B-3 (0.3) | B-3 (0.3) | B-3 (0.3) | B-4 (0.3) | B-3 (0.3) | B-3 (0.3) | B-3 (0.3) |
| (C) Acrylic resin Note 3 (wt. %) | C-1 (10) | C-1 (10) | C-1 (10) | C-1 (20) | C-1 (20) | C-1 (20) | C-1 (30) | C-1 (10) | C-1 (20) | C-2 (20) | C-1 (10) | C-1 (10) | C-1 (10) | C-1 (20) | C-1 (10) |
| (D) Fluororesin Note 4 (wt. %) | D-1 (5) | D-1 (5) | D-1 (5) | D-1 (5) | D-1 (2) | D-1 (10) | D-1 (5) | D-2 (5) | D-2 (5) | D-1 (5) | D-1 (5) | D-1 (5) | D-1 (5) | D-1 (5) | D-2 (5) |
| Carbon black (wt. %) | — | — | — | — | — | — | — | — | — | — | — | — | 0.5 | 0.5 | 0.5 |
| Weather resistance test (A) | | | | | | | | | | | | | | | |
| Crack formation time (h) | 70 | 60 | 110 | 160 | 130 | 180 | 180 | 100 | 150 | 150 | 110 | 110 | 190 | 250 | 170 |
| Change in gloss | | | | | | | | | | | | | | | |
| 100 h | 2 | 2 | 1 | 1 | 1 | 1 | 1 | 1 | 1 | 1 | 1 | 1 | 1 | 1 | 1 |
| 200 h | 4 | 4 | 2 | 1 | 2 | 1 | 1 | 3 | 1 | 1 | 2 | 3 | 1 | 1 | 1 |
| 300 h | 5 | 5 | 4 | 3 | 4 | 2 | 2 | 4 | 3 | 3 | 4 | 4 | 3 | 2 | 3 |
| Weather resistance test (B) | | | | | | | | | | | | | | | |
| Crack formation time (h) | 660 | 600 | 1020 | 1640 | 1480 | 1780 | 1800 | 920 | 1520 | 1480 | 960 | 960 | 1840 | >2000 | 1660 |
| Change in gloss | | | | | | | | | | | | | | | |
| 600 h | 1 | 1 | 1 | 1 | 1 | 1 | 1 | 1 | 1 | 1 | 1 | 1 | 1 | 1 | 1 |
| 1000 h | 3 | 3 | 2 | 1 | 2 | 1 | 1 | 3 | 1 | 1 | 1 | 2 | 1 | 1 | 1 |
| 2000 h | 4 | 4 | 3 | 3 | 3 | 2 | 2 | 4 | 3 | 3 | 3 | 3 | 1 | 1 | 2 |
| Moldability | ⊙ | ⊙ | ⊙ | ⊙ | Δ | ⊙ | Δ | ⊙ | ⊙ | ○ | ⊙ | ⊙ | ⊙ | ⊙ | ⊙ |

| | Comparative Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (A) Polyacetal resin (wt. %) | 89.4 | 89.4 | 99.4 | 94.4 | 89.4 | 79.4 | 69.4 | 79.4 | 89.4 | 89.4 | 88.9 | 78.9 |
| (B) Weather (light) stabilizer | | | | | | | | | | | | |
| Note 1 (wt. %) | B-1 (0.6) | — | B-1 (0.3) | B-1 (0.3) | B-1 (0.3) | B-1 (0.3) | B-1 (0.3) | B-1 (0.3) | B-2 (0.3) | B-1 (0.3) | B-1 (0.3) | B-1 (0.3) |
| Note 2 (wt. %) | — | B-3 (0.6) | B-3 (0.3) | B-3 (0.3) | B-3 (0.3) | B-3 (0.3) | B-3 (0.3) | B-3 (0.3) | B-4 (0.3) | B-3 (0.3) | B-3 (0.3) | B-3 (0.3) |
| (C) Acrylic resin Note 3 (wt. %) | C-1 (10) | C-1 (10) | — | — | C-1 (10) | C-1 (20) | C-1 (30) | C-2 (20) | C-1 (10) | C-1 (10) | C-1 (10) | C-1 (20) |
| (D) Fluororesin Note 4 (wt. %) | — | — | — | D-1 (5) | — | — | — | — | — | — | — | — |
| Carbon black (wt. %) | — | — | — | — | — | — | — | — | — | — | 0.5 | 0.5 |
| Weather resistance test (A) | | | | | | | | | | | | |
| Crack formation time (h) | 40 | 40 | 40 | 40 | 60 | 90 | 130 | 70 | 60 | 60 | 110 | 190 |
| Change in gloss | | | | | | | | | | | | |
| 100 h | 3 | 3 | 3 | 3 | 3 | 2 | 1 | 2 | 3 | 3 | 2 | 1 |
| 200 h | 5 | 5 | 4 | 5 | 5 | 4 | 2 | 5 | 5 | 5 | 4 | 2 |
| 300 h | 5 | 5 | 5 | 5 | 5 | 5 | 5 | 5 | 5 | 5 | 5 | 4 |
| Weather resistance test (B) | | | | | | | | | | | | |
| Crack formation time (h) | 420 | 400 | 380 | 440 | 620 | 880 | 1200 | 740 | 580 | 540 | 1040 | 1660 |
| Change in gloss | | | | | | | | | | | | |
| 600 h | 2 | 2 | 2 | 2 | 2 | 2 | 1 | 2 | 2 | 2 | 1 | 1 |
| 1000 h | 5 | 5 | 5 | 5 | 3 | 4 | 3 | 4 | 5 | 5 | 3 | 2 |
| 2000 h | 5 | 5 | 5 | 5 | 5 | 5 | 5 | 5 | 5 | 5 | 5 | 4 |

TABLE 1-continued

| Moldability | Δ | Δ | ⊚ | ⊚ | ΔX | X | X | X | ΔX | ΔX | Δ | X |

Note 1:
B-1: 2-[2-hydroxy-3,5-bis(α,α-dimethyl benzylphenyl]benzotriazole,
B-2: 2-hydroxy-4-oxybenzylbenzophenone
Note 2:
B-3: bis(2,2,6,6-tetramethyl-4-piperidyl) sebacate,
B-4: dimethyl succinate/1-(2-hydroxyethyl-4-hydroxy-2,2,6,6-tetramethylpiperidine polycondensate
Note 3:
C-1: methyl methacrylate resin [average molecular weight: 60,000]
C-2: methyl methacrylate resin [average molecular weight: 20,000]
Note 4:
D-1: polyvinylidene fluoride
D-2: polytetrafluoroethylene While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weather-resistance molded article formed of a polyacetal resin composition which comprises, based on the total weight of the compositions, a melt-blend of:
   (A) a polyacetal base resin;
   (B) between 0.01 to 5% by weight of a weather stabilizer which is at least one selected from the group consisting of benzotriazoles, benzophenones, aromatic benzoates, cyanoacrylates, oxalanilides and hindered amines;
   (C) between 1 to 40% by weight of an acrylic resin which is at least one resin selected from the group consisting of methyl methacrylate homopolymers or methyl methacrylate copolymers mainly comprised of methyl methacrylate; and
   (D) a fluororesin which is one or more polymers selected from the group consisting of polytetrafluoroethylene, polyvinyl fluoride, polyvinylidene fluoride tetrafluoroethylene/hexafluoropropylene copolymer and tetrafluoroethylene/ethylene copolymer, and wherein
   said fluororesin being present in an effective amount of between 1 to 20% by weight to enhance the acrylic resin's fluidity within said polyacetal base resin such that said acrylic resin is present in a localized region near a surface of the molded article, whereby weather-resistance of the molded article is improved.

2. A weather-resistant molded article according to claim 1, wherein the weather stabilizer is a combination of a hindered amine, and one or more compounds selected from the group consisting of benzotriazoles, benzophenones, aromatic benzoates, cyanoacrylates and oxalanilides.

3. A weather-resistant polyacetal resin molding composition comprising a blend of a polyacetal base resin and weather-resistant effective amount of a weather stabilization package which includes, based upon the total weight of the composition:
   (i) between 0.01 to 5 wt. % of a weather stabilizer that is at least one selected from the group consisting of benzotriazoles, benzophenones, aromatic benzoates, cyanoacrylates, oxalanilides and hindered amines;
   (ii) between 1 to 40 wt. % of an acrylic resin which is selected from homopolymers or copolymers of acrylic or methacrylic acid, or ester derivatives thereof; and
   (iii) a fluororesin which is present in an effective amount of between 1 to 20 wt. % to enhance the acrylic resin's fluidity within said polyacetal base resin such that the acrylic resin is present in a localized surface region of a molded article, whereby weather-resistance of the molded article is improved.

4. A weather-resistant polyacetal resin composition as in claim 6, which further comprises at least one additive selected from the group consisting of lubricants, nucleating agents, release agents, antistatic agents, surfactants, impact modifiers, and inorganic or organic fibrous, powdery or platy fillers.

5. A weather-resistant polyacetal resin composition as in claim 3, which further includes a colorant.

6. A weather-resistant polyacetal resin composition as in claim 5, wherein said colorant is carbon black.

7. A molded article which consists essentially of the weather-resistant polyacetal resin composition of claim 3.

8. A weather-resistant molded article according to claim 1, which further includes a colorant.

9. A weather-resistant molded article according to claim 8, wherein the colorant is carbon black.

* * * * *

UNITED STATES PATENT AND TRADEMARK OFFICE
CERTIFICATE OF CORRECTION

PATENT NO. : 5,086,095

DATED : February 4, 1992

INVENTOR(S) : Toru KATSUMATA

It is certified that error appears in the above-identified patent and that said Letters Patent is hereby corrected as shown below:

Column 1, line 34, after "and/or" delete "outer atmosphere" and insert --other atmosphere--.

Column 3, line 10, delete "(2-ethyle-phenyl)" and insert --2-ethylphenyl--; line 21, delete the entire line.

Column 5, line 55, after "added" delete the comma (,); line 68, after "to" delete "conventionally" and insert --conventional--.

Column 6, line 44, before "then" delete "were" and insert --was--.

Column 9, claim 1, line 1, after "A" delete "weather-resistance" and insert --weather-resistant--; claim 1, line 3, after "the" change "compositions" to --composition--.

Column 10, claim 4, line 2, after "claim" change "6" to --3--.

Signed and Sealed this

Fourth Day of May, 1993

Attest:

MICHAEL K. KIRK

Attesting Officer

Acting Commissioner of Patents and Trademarks